United States Patent
Kim et al.

(10) Patent No.: US 8,919,788 B2
(45) Date of Patent: Dec. 30, 2014

(54) GYROSCOPIC SYSTEM IN VEHICLE SUSPENSION

(71) Applicant: Lit Motors Corporation, San Francisco, CA (US)

(72) Inventors: Daniel Kee Young Kim, Vancouver, WA (US); Eric Miller, Torrance, CA (US)

(73) Assignee: Lit Motors Corporation, San Francisco, CA (US)

( * ) Notice: Subject to any disclaimer, the term of this patent is extended or adjusted under 35 U.S.C. 154(b) by 0 days.

(21) Appl. No.: 13/974,942

(22) Filed: Aug. 23, 2013

(65) Prior Publication Data

US 2014/0054867 A1      Feb. 27, 2014

Related U.S. Application Data

(60) Provisional application No. 61/693,561, filed on Aug. 27, 2012.

(51) Int. Cl.
    *B60G 17/016*   (2006.01)
    *B60G 17/019*   (2006.01)
    *B60G 21/08*    (2006.01)

(52) U.S. Cl.
    CPC ...... *B60G 17/0162* (2013.01); *B60G 17/01908* (2013.01); *B60G 21/08* (2013.01); *B60G 2400/0511* (2013.01)
    USPC ......................................... 280/5.506; 701/38

(58) Field of Classification Search
    USPC ................. 280/5.506, 5.508; 701/38
    See application file for complete search history.

(56) References Cited

U.S. PATENT DOCUMENTS 3,881,736 A * 5/1975 Wilfert ........................ 280/5.507
8,322,471 B2 * 12/2012 Schroll ......................... 180/54.1
2011/0036655 A1  2/2011 Ackley
2011/0231041 A1  9/2011 Kim et al.
2012/0029770 A1 * 2/2012 Hirao et al. .................... 701/38
2012/0298430 A1 * 11/2012 Schroll et al. ................. 180/8.1
2013/0190980 A1 * 7/2013 Ramirez Ruiz ................ 701/38
2013/0233100 A1 * 9/2013 Kim .............................. 74/5.95
2013/0238233 A1 * 9/2013 Kim et al. .................... 701/301
2013/0270018 A1 * 10/2013 Kim et al. .................... 180/54.1
2013/0274995 A1 * 10/2013 Kim et al. ...................... 701/36

FOREIGN PATENT DOCUMENTS

DE      102010015132      10/2011

OTHER PUBLICATIONS

International Search Report and Written Opinion for International Application No. PCT/US2013/056880 dated Nov. 28, 2013, whole document.

* cited by examiner

*Primary Examiner* — Drew Brown
(74) *Attorney, Agent, or Firm* — Blakely Sokoloff Taylor Zafman LLP

(57) ABSTRACT

Embodiments of the invention describe methods, apparatuses, and systems for enhanced vehicle stabilization solutions. Embodiments of the invention may receive sensor information from at least one sensor coupled to a vehicle having two or more wheels, the at least one sensor coupled to at least one of a wheel, a suspension component, or a frame of the vehicle. A tilt angle of the vehicle is determined from the received sensor information, the tilt angle comprising an offset angle from a reference plane for the vehicle. A controller transmits a command to one or more control moment gyroscopes (CMGs) coupled to the frame of the vehicle to produce a total angular moment based, at least in part, on the tilt angle of the vehicle.

19 Claims, 5 Drawing Sheets

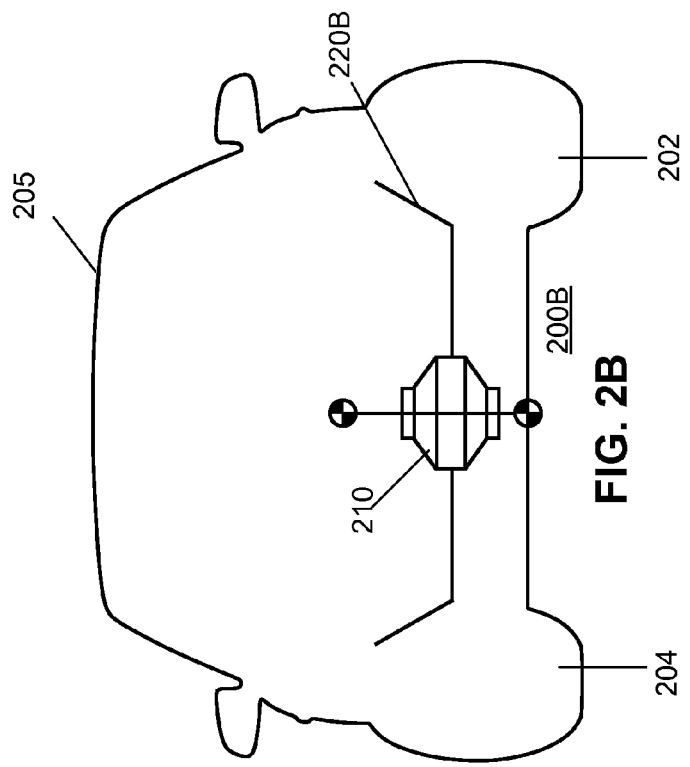
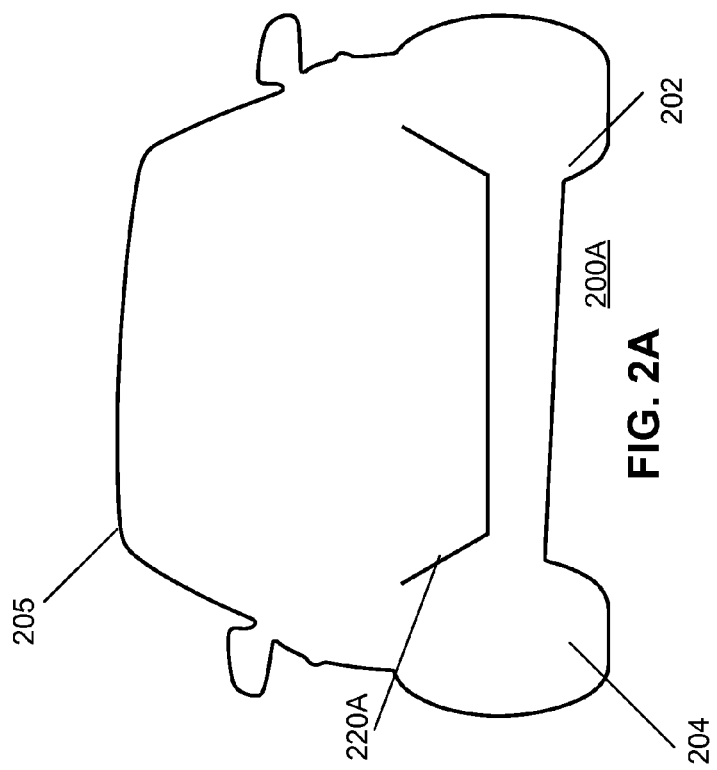

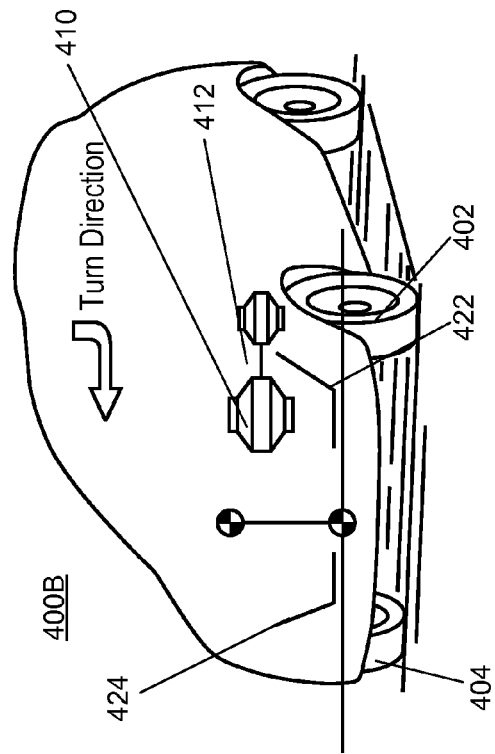
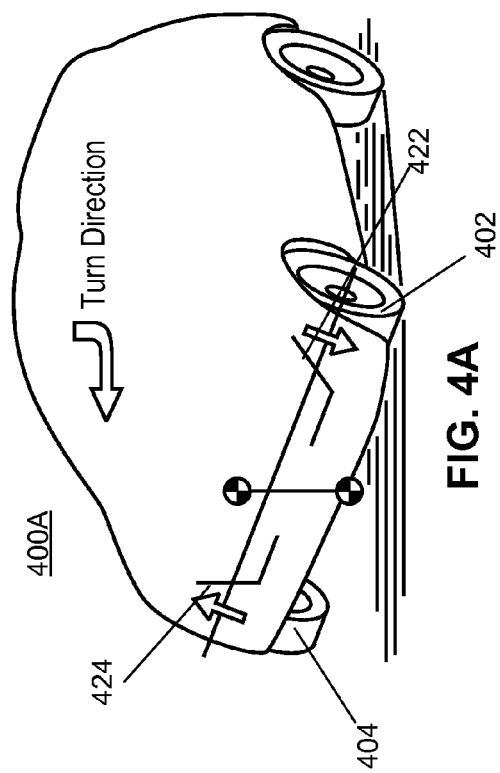

GYROSCOPIC SYSTEM IN VEHICLE SUSPENSION

CLAIM OF PRIORITY

This application claims priority to Provisional Application No. 61/693,561 filed on Aug. 27, 2012.

FIELD OF THE INVENTION

Embodiments of the invention generally pertain to transportation vehicles, and more particularly to vehicle power and stabilization systems.

BACKGROUND

Vehicle stabilization has become an increasingly important aspect of vehicle design to improve safety, performance, and energy efficiency. Prior art solutions for vehicle suspension solutions consist only of typical suspension components such as springs, dampeners, hydraulics, and/or strut/anti-sway bars; however these solutions are directed towards absorbing forces in order to reduce their impact on a vehicle's position. What is needed is a solution to augment these suspension components to more directly counter the forces affecting the vehicle's angle/position.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. It should be appreciated that the following figures may not be drawn to scale.

FIG. 2A and FIG. 2B illustrate one or more control moment gyroscopes changing the lean dynamics of a vehicle during a turn according to an embodiment of the disclosure.

FIG. 4A and FIG. 4B illustrate one or more control moment gyroscopes changing the stability of a vehicle during off-road use according to an embodiment of the disclosure.

Descriptions of certain details and implementations follow, including a description of the figures, which may depict some or all of the embodiments described below, as well as a discussion of other potential embodiments or implementations of the inventive concepts presented herein. An overview of embodiments of the invention is provided below, followed by a more detailed description with reference to the drawings.

DESCRIPTION

Embodiments of the invention describe methods, apparatuses, and systems for enhanced vehicle stabilization solutions. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Figure 1B:
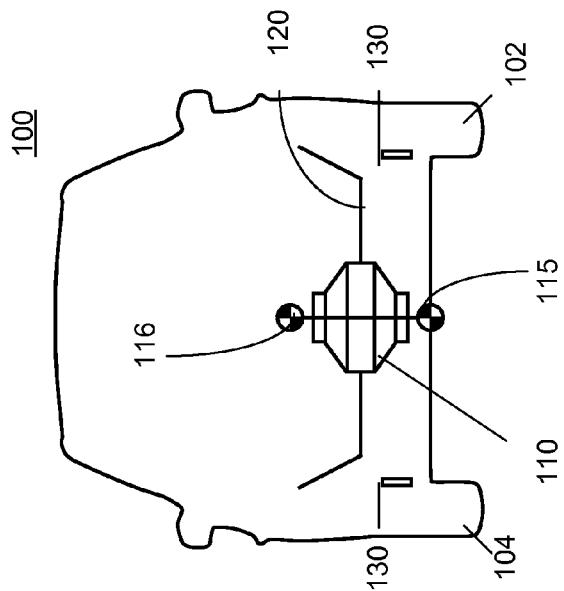
FIG. 1A and FIG. 1B illustrate side and front views of a vehicle including an enhanced stabilization system according to an embodiment of the disclosure.
Figure 1A:
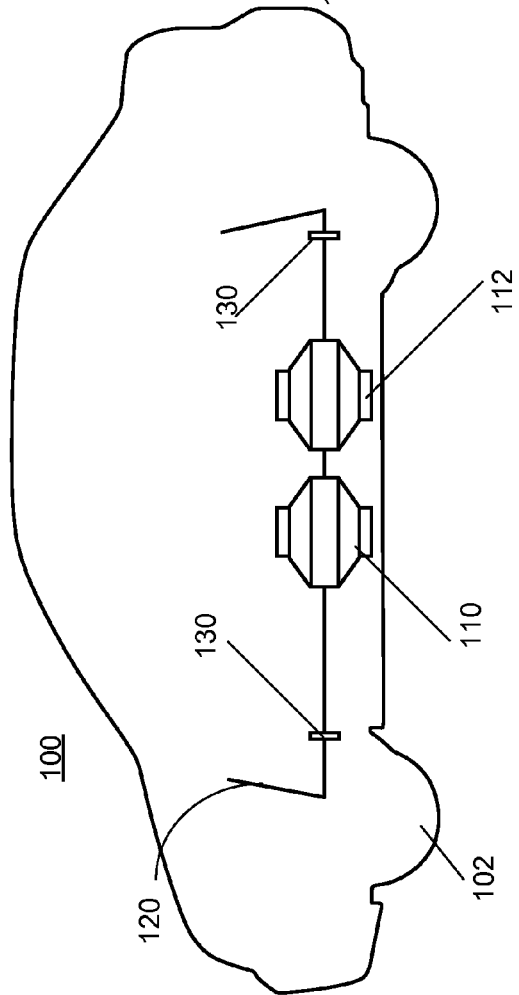

FIG. 1A and FIG. 1B illustrate side and front views of a vehicle including an enhanced stabilization system according to an embodiment of the disclosure. In this embodiment, vehicle 100 is shown to include multiple control moment gyroscopes (CMGs), 110 and 112, to assist the vehicle's suspension system as described below.

Gyroscopes are energy storage elements built around a rotating flywheel. The flywheel acts as a torque transducer, taking torque applied in one axis and outputting it in another axis. A 'CMG' typically describes a gyroscope specifically applied for attitude control of rigid bodies (traditionally used in satellites and spacecraft). As described below, with various configurations, a single or multiple CMG system may be applied to the automotive domain to increase vehicle stability without reducing its velocity (e.g., via differential braking), adding large passive elements (e.g., a spoiler), or utilizing active traction control with independent wheel torque distribution.

As referred to herein, a CMG describes a gyroscopic device included in a housing that supports a gimbal assembly. Said gimbal assembly includes a rotor having an inertial element (e.g., a rotating ring or cylinder) coupled to a shaft. Spin bearings may be disposed around the shaft ends to allow for rotational movement of the shaft, which may be rotated about a spin axis by a spin motor. The gimbal assembly, in turn, may be rotated about a gimbal axis by a torque module assembly mounted to a first end of the CMG housing. Thus, compared to other types of gyroscopes that adjust their output torque by altering their flywheel rotation speeds, CMGs may tilt their rotors' spin axes to alter their output torque (while not necessarily altering their flywheel rotation speeds).

To enable the rotational movement of the gimbal assembly, gimbal bearings are disposed between it and the CMG housing. Electrical signals and power may be received by the gimbal assembly via any power controller means known in the art. The CMG may also include any number of sensors (e.g., an encoder, a resolver, a tachometer, etc.) suitable for determining rotational rate and position of the gimbal assembly.

CMGs 110 and 112 are used in combination with suspension system 120 of vehicle 100 to stabilize the vehicle in different driving conditions. FIG. 1A and FIG. 1B generally illustrate the positioning of some of the components of suspension system 120. It is understood that said suspension system may include, for example, springs, dampers (such as shock absorbers), hydraulics, and/or strut/anti-sway bars.

Under certain conditions, a vehicle may slip or rollover. As referred to herein, a 'slip' is an in-plane phenomenon characterized by the difference between the vehicle heading angle and velocity vector; a 'rollover' is a lateral phenomenon that occurs when tight cornering produces zero normal force on the inner tires, and occurs as a result of a high cornering velocity and a small radius of curvature. At a certain point in cornering, a vehicle may come to the stability boundary at which slip/rollover may occur.

In embodiments of the invention, one or more CMGs may generate torque about the roll axis of the vehicle, resulting in additional normal force on the inner tires to prevent rollover. Said one or more CMGs used for rollover stabilization may therefore also mitigate slip, assuming that slip occurs before rollover.

CMGs 110 and 112 may each be actuated on one or more axes, and may utilize an electronic control or mechanical control system. Said control system may receive information from one or more electronic sensors 130 to control the total angular momentum generated by the CMGs. These sensors may be mounted on any portions of the frame, suspension system or wheel assembly (e.g., a tire, rim, fender, etc.) of vehicle 100. Said control system may control CMGs 110 and 112 further based on the acceleration of vehicle 100, the position of one or more steerable wheels of the vehicle (i.e., front wheels 102 and 104, as shown in FIG. 1B illustrating the front view of vehicle 100), the engaging of the braking system of the vehicle, etc. In some embodiments, the CMGs may receive regenerated energy received from a vehicle braking system or from any electromechanical component of the vehicle that converts mechanical energy to electrical energy (e.g., an electrical generator such as an alternator or other components of a vehicle drive motor, etc.).

CMGs 110 and 112 are shown in FIG. 1A and FIG. 1B to be positioned inline and between (e.g., centered, not centered) the front and rear wheels of vehicle 100 such that moment center 115 of the CMGs (as shown in FIG. 1B) is longitudinally in-line and below the vehicle's center of gravity 116. While CMGs are often used in pairs so as to eliminate the yaw moment produced by each and double the torque produced, in other embodiments, any number of CMGs (i.e., one, more than two) may be placed in any configuration to augment a vehicle's suspension system.

FIG. 2A and FIG. 2B illustrate one or more CMGs changing the lean dynamics of a vehicle during a turn according to an embodiment of the disclosure. In FIG. 2A, vehicle 200A comprises a vehicle with more than two wheels and suspension system 220A which, in this example, is not gyroscopically assisted (e.g., a suspension similar to the suspension system 120 of FIG. 1A and FIG. 1B with the CMGs disengaged). Vehicle 200A is shown to include front wheels 202 and 204 engaged in a turn to the left-hand side (with respect to the driver), which causes vehicle frame 205 to tilt off-center to the right (with respect to the driver).

FIG. 2B illustrates vehicle 200B with at least one CMG 210 augmenting suspension system 220B to bring vehicle frame 205 to a level stasis during a turn. As described herein, "level stasis" may refer to the leveling of a vehicle frame from side-to-side, front-to-back, or both. The rotor of CMG(s) 210 is thus spinning at such a rate that changing the plane of rotation of the rotor (and not necessarily the rotational speed of the rotor) creates an output torque about an output axis that is normal to the spin/gimbal axis (i.e., in the desired direction to create a "leveling" force of frame 205).

CMG(s) 210 may be controlled based on sensors coupled with components of suspension system 220B to detect whether said components are engaged, and therefore are affecting a vehicle's angle. For example, sensors may detect the compression of a suspension spring unit, detect and/or measure the amount of force absorbed/dissipated by one or more shock absorbers, and/or detect and/or measure torsion on a strut/anti-sway bar. In some embodiments, additional sensors are coupled to the wheel assembly of front wheels 202 and 204 to detect its orientation, and the likelihood of vehicle lean based on said orientation.

Data from these sensors are used by the controller of CMG(s) 210 to "torque" the gimbal axis for changing the direction of the momentum vector of the CMG(s), thereby changing the net amount of force applied to vehicle frame 205. By bringing vehicle 200B to a level stasis during a turn, embodiments of the invention may increase the maximum speed a vehicle may safely enter/exit a turn, decrease the turning radius a vehicle may execute without slip/rollover, may increase passenger comfort during a turn, prolong the lifespan of the components of suspension system 220 by reducing the wear on these components during their lifetime, etc.

Figure 3B:
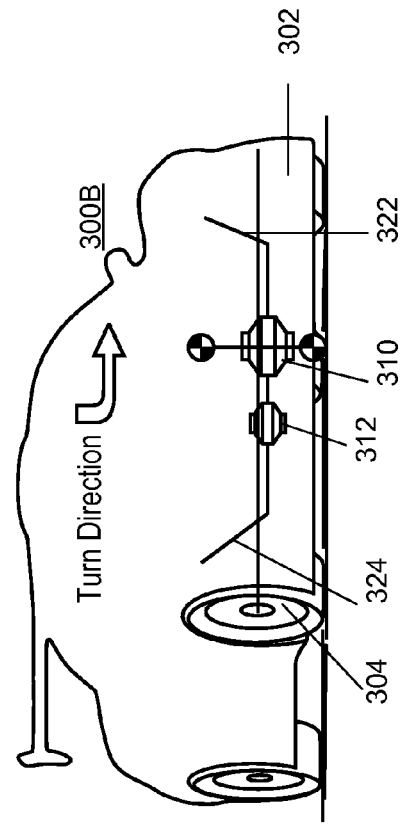
FIG. 3A and FIG. 3B illustrate one or more control moment gyroscopes changing the lean dynamics of a vehicle during a turn according to an embodiment of the disclosure
Figure 3A:
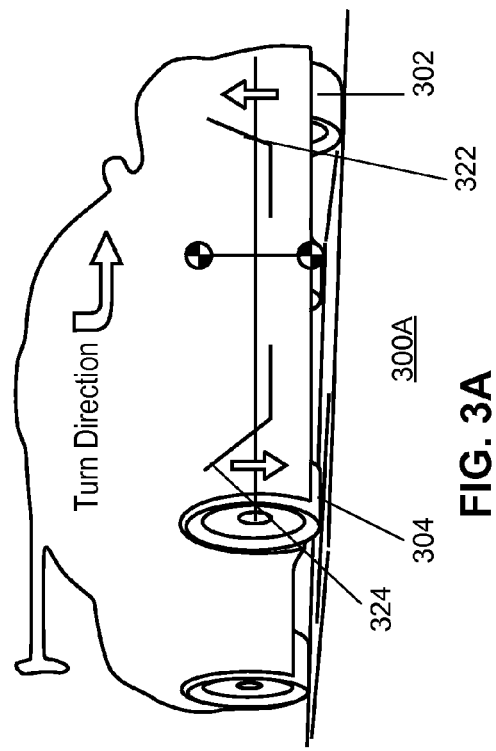

FIG. 3A and FIG. 3B illustrate one or more CMGs changing the lean dynamics of a vehicle during a turn according to an embodiment of the disclosure. In FIG. 3A, vehicle 300A comprises a vehicle with more than two wheels and a non-gyroscopically assisted suspension system (e.g., a suspension similar to the suspension system 120 of FIG. 1A and FIG. 1B with the CMGs disengaged) including suspension springs 322 and 324 to stabilize front wheels 302 and 304, respectively. Vehicle 304 is shown to be engaged in a turn to the left-hand side (with respect to the driver), which creates a downward force on spring 324, and an upward force of spring 322, thereby creating a vehicle tilt.

FIG. 3B illustrates vehicle 300B with CMGs 310 and 312. The CMGs generate a control moment center to reduce or eliminate the downward force on spring 324 and the upward force of spring 322, thereby leveling the stasis of the vehicle frame. The positioning of multiple CMGs in a vehicle may vary in different embodiments of the invention; furthermore, the sizes of the multiple CMGs may be the same, or may be different.

FIG. 4A and FIG. 4B illustrate one or more CMGs changing the stability of a vehicle during off-road use according to an embodiment of the disclosure. In FIG. 4A, vehicle 400A comprises a vehicle with more than two wheels and a non-gyroscopically assisted suspension system (e.g., a suspension similar to the suspension system 120 of FIG. 1A and FIG. 1B with the CMGs disengaged) including suspension springs 422 and 424 to stabilize front wheels 402 and 404, respectively. Vehicle 400A is shown to be engaged in a turn to the right-hand side (with respect to the driver), which creates a downward force on spring 422, and an upward force of spring 424, thereby creating a vehicle tilt.

"Off-road use conditions" as referred to herein may comprise any factors external to the vehicle to contribute the vehicle instability—including, but not limited to: uneven, unpaved, and/or loose-gravel surfaces, or wet/muddy/icy surfaces, or driving in extreme environmental conditions such as heavy rain/snow/wind. FIG. 4A illustrates vehicle 400A performing a turn wherein the conditions lift one or more wheels (including wheel 404) from the driving surface.

FIG. 4B illustrates vehicle 400B with CMGs 410 and 412. The CMGs generate a control moment center to reduce or eliminate the downward force on spring 424 and the upward force of spring 422, thereby leveling the stasis of the vehicle frame. In this embodiment, sensors placed within/around vehicle 400B are able to detect the forces caused by the off-road use conditions; the controller for CMGs 410 and 412 cause the CMGs to generate a control moment strong enough to prevent any wheels from not being in sufficient contact with the driving surface. CMGs 410 and 412 effectively produce an external force on the inside tire so as to prevent the liftoff illustrated in FIG. 4A. The CMGs generate torque about the roll axis of vehicle 400B, resulting in additional normal force on the inner tires and further eliminating any potential roll/slip of the vehicle.

Figure 5:
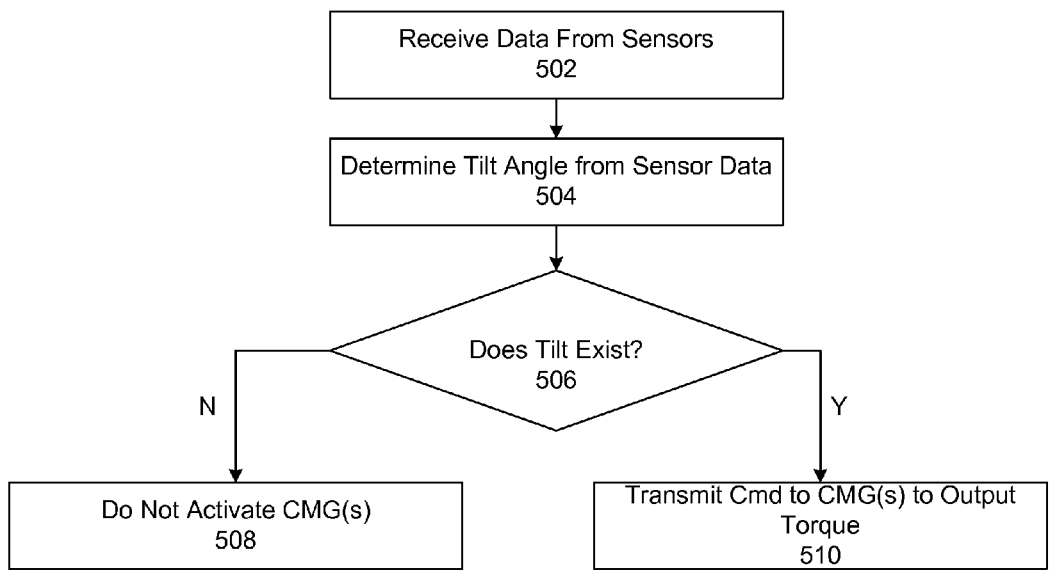
FIG. 5 is a flow diagram for a process for augmenting a vehicle suspension system via one or more control moment gyroscopes according to an embodiment of the disclosure.

FIG. 5 is a flow diagram for a process for augmenting a vehicle suspension system via one or more CMGs according to an embodiment of the disclosure. Flow diagrams as illustrated herein provide examples of sequences of various process actions. Although shown in a particular sequence or order, unless otherwise specified, the order of the actions can be modified. Thus, the illustrated implementations should be understood only as examples, and the illustrated processes can be performed in a different order, and some actions may be performed in parallel. Additionally, one or more actions can be omitted in various embodiments of the invention; thus, not all actions are required in every implementation. Other process flows are possible.

Process 500 includes operations for receiving sensor information from one or more sensors coupled to a vehicle having two or more wheels, 502. Said vehicle may comprise a two-wheeled vehicle such as a motorcycle, a three-wheeled vehicle such as a tri-car, or a four-wheeled vehicle such as a conventional automobile or truck. Said sensor(s) may be coupled to at least one of the wheels, a suspension component, or a frame of the vehicle. In some embodiments, said sensor(s) may comprise one or more of an inertial measurement unit, a height sensor, an angle sensor, a length sensor, and/or a distance sensor.

Using the sensor information described above, a tilt angle of the vehicle is determined, 504. The tilt angle comprises an offset angle from a reference plane for the vehicle; this reference plane may comprise, for example, a level stasis for the vehicle. Said tilt angle may further indicate potential slip, liftoff or rollover conditions. It is determined if the tilt angle comprises a significant enough value to augment the suspension system of the vehicle with the one or more CMGs coupled to the vehicle frame, 506. If there is little or no tilt angle, the CMGs are not activated or controlled to produce an output torque, 508.

If a tilt angle is present, a CMG controller may transmit a command to the one or more CMGs coupled to the frame of the vehicle to produce a total angular moment based, at least in part, on the tilt angle of the vehicle, 510. Each of the one or more CMGs may be actuated on one or more axes. In some embodiments, the total angular momentum of the one or more CMGs is further based on an acceleration of the vehicle and/or is further based on a position of one or more steerable wheels of the vehicle.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

Some portions of the detailed description above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent series of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion above, it is appreciated that throughout the description, discussions utilizing terms such as "capturing," "transmitting," "receiving," "parsing," "forming," "monitoring," "initiating," "performing," "adding," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein via circuitry, logic or processor-executed software modules. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Some portions of the detailed description above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "capturing", "determining", "analyzing", "driving", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The algorithms and displays presented above are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout the above specification are not necessarily all referring to the same embodiment. Furthermore, the particular features, structures, or characteristics may be combined in any suitable manner in one or more embodiments.

The present description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the various embodiments with various modifications as may be suited to the particular use contemplated.

Methods and processes, although shown in a particular sequence or order, unless otherwise specified, the order of the actions may be modified. Thus, the methods and processes described above should be understood only as examples, and may be performed in a different order, and some actions may be performed in parallel. Additionally, one or more actions may be omitted in various embodiments of the invention; thus, not all actions are required in every implementation. Other process flows are possible.

The invention claimed is:

1. A vehicle comprising:
   a frame;
   three wheels, including at least one front wheel and at least one rear wheel, wherein the three wheels includes at least one steerable wheel;
   at least one suspension component;
   at least one sensor coupled to at least one of the three wheels, the at least one suspension component, or the frame;
   one or more control moment gyroscopes (CMGs) coupled to the frame; and
   a CMG controller to:
      receive sensor information from the at least one sensor;
      determine a tilt angle of the vehicle from the sensor information, the tilt angle comprising an offset angle from a reference plane for the vehicle; and
      transmit a command to one or more CMGs coupled to the frame of the vehicle to produce a total angular moment based, at least in part, on the tilt angle of the vehicle.

2. The vehicle of claim 1, wherein the one or more CMGs optionally receive regenerated energy received from a vehicle braking system or an electrical generator.

3. The vehicle of claim 1, wherein the reference plane comprises a level stasis for the vehicle.

4. The vehicle of claim 1, wherein each of the one or more CMGs is actuated on one or more axes.

5. The vehicle of claim 1, wherein the total angular momentum of the one or more CMGs is further based on an acceleration of the vehicle.

6. The vehicle of claim 1, wherein the total angular momentum of the one or more CMGs is further based on a position of the at least one steerable wheel of the vehicle.

7. The vehicle of claim 1, wherein the at least one sensor comprises one or more of an inertial measurement unit, a height sensor, an angle sensor, a length sensor, or a distance sensor.

8. The vehicle of claim 1, wherein the one or more CMGs comprise a plurality of CMGs coupled with at least one of the three wheels.

9. A method comprising:
   receiving sensor information from at least one sensor coupled to a vehicle having three wheels, including at least one front wheel and at least one rear wheel, the at least one sensor coupled to at least one of the three wheels, a suspension component, or a frame of the vehicle;
   determining a tilt angle of the vehicle from the received sensor information, the tilt angle comprising an offset angle from a reference plane for the vehicle; and
   transmitting a command to one or more control moment gyroscopes (CMGs) coupled to the frame of the vehicle to produce a total angular moment based, at least in part, on the tilt angle of the vehicle.

10. The method of claim 9, further comprising:
    routing regenerated energy to the one or more CMGs from at least one of a vehicle braking system or a vehicle drive motor.

11. The method of claim 9, wherein the reference plane comprises a level stasis for the vehicle.

12. The method of claim 9, wherein each of the one or more CMGs is actuated on one or more axes.

13. The method of claim 9, wherein the total angular momentum of the one or more CMGs is further based on an acceleration of the vehicle.

14. The method of claim 9, wherein the total angular momentum of the one or more CMGs is further based on a position of one or more steerable wheels of the vehicle.

15. The method of claim 9, wherein the at least one sensor comprises one or more of an inertial measurement unit, a height sensor, an angle sensor, a length sensor, or a distance sensor.

16. The method of claim 9, wherein the one or more CMGs comprise a plurality of CMGs coupled with at least one of the three wheels.

17. An apparatus comprising:
    a data bus to receive sensor information from one or more sensors coupled to a vehicle having three wheels, including at least one front wheel and at least one rear wheel, the one or more sensors coupled at least one of the three wheels, a suspension component, or a frame of the vehicle; and
    logic to:
       determine from the sensor information a tilt angle of the vehicle, the tilt angle comprising an offset angle from a reference plane for the vehicle; and
       transmit a command to one or more control moment gyroscopes (CMGs) coupled to the frame of the vehicle to produce a total angular moment based, at least in part, on the tilt angle of the vehicle.

18. The apparatus of claim 17, wherein the total angular momentum of the one or more CMGs is further based on at least one of an acceleration of the vehicle, or on a position of one or more steerable wheels of the vehicle.

19. The apparatus of claim 17, wherein the one or more sensors comprises one or more of an inertial measurement unit, a height sensor, an angle sensor, a length sensor, and/or a distance sensor.

* * * * *